United States Patent Office 3,395,129
Patented July 30, 1968

3,395,129
PROCESS FOR CROSS-LINKING POLYURETHANES BY THE FORMATION OF QUATERNARY NITROGENS
Dieter Dieterich and Otto Bayer, Leverkusen, Julius Peter, Odenthal, and Erwin Müller, Leverkusen, Germany, assignors to Farbenfabriken Bayer Aktiengesellschaft, Leverkusen, Germany, a German corporation
No Drawing. Filed June 3, 1963, Ser. No. 284,859
Claims priority, application Germany, June 5, 1962, F 36,987
9 Claims. (Cl. 260—77.5)

This invention relates to polyurethane plastics and more particularly to cross-linked polyurethane plastics and a method of conducting the crosslinking.

It has been heretofore known to prepare high molecular weight polymers by reacting substantially linear polyesters containing hydroxyl groups and groups capable of onium-formation, for example, tertiary nitrogen atoms, with polyfunctional peralkylation agents to thereby accomplish crosslinking.

For the formation of elastomeric water-insoluble high molecular weight polymers, a linear polyester prepared using a glycol containing tertiary amino group such as methyl diethanol amine is used at least in part as the glycol component for the formation of the polyester. These polyesters are then extended with aliphatic isocyanates and the resin thus formed is reacted with dihalogen compounds.

This process has several disadvantages which prevent its commercial use. The amino groups, for example, are incorporated into the polyester thereby rendering the polyester strongly basic. This basicity makes the polyester susceptible to hydrolysis while at the same time prevents the reduction of the acid number of the polyester to suitable low level because of salt formation during esterification.

Furthermore, since tertiary amines have a strong catalytic action on the hydroxyl isocyanate reaction and also on the trimerization of NCO groups, the process is limited to the less reactive aliphatic isocyanates. This is disadvantageous for the reason that it is desirable to utilize aromatic isocyanates and particularly diisocyanates such as 4,4'-diphenylmethane diisocyanate in the preparation of elastomeric products because of the improved properties accompanying the use of these isocyanates.

The incorporation of the amino group into the polyester also has the additional effect that the quaternizable nitrogen atoms are incorporated in the polyester chain in an irregular fashion, so that a very irregular lattice is formed on quaternization with bifunctional compounds and this accordingly results in poor mechanical properties in the elastomers which result, especially as the nitrogen atoms of this chain which are suitably juxtaposed with one another can also react with the dialkylation agent to form rings. The probability of such a ring formation increases with rising amine content.

It also has been heretofore known to prepare linear high molecular weight polyaddition products suitable for crosslinking reactions, in which linear polyesters not containing any groups suitable for crosslinking are linked through isocyanate groups until compounds containing groups suitable for crosslinking wherein substantially all of the isocyanate groups are reacted. Thus, materials are obtained containing groups suitable for crosslinking such as multiple bonds, active hydrogen atoms, tertiary nitrogen atoms or halogen atoms at regular spacings in the molecule chain. These regularly spaced groupings are able to form a uniform lattice when vulcanization is suitably carried out.

It has not been possible however, for materials comprising halogen atoms or tertiary amino groups to be converted by a quaternization reaction into high molecular weight polymers which are sufficiently cross-linked and suitable for industrial purposes. The reason for this is not apparent, especially as it has not been established, any relationship with the basicity of the incorporated amine.

It is therefore an object of this invention to provide improved cross-linked polyurethane plastics. It is another object of this invention to provide an improved method of making cross-linked polyurethane plastics. It is still another object of this invention to provide cross-linked polyurethane plastics having a hydrophylic characteristic in combination with slight swelling characteristics in water.

The foregoing objects and others which will become apaprent from the following description are accomplished in accordance with the invention generally speaking by providing cross-linked polyurethane plastics by reacting an isocyanate modified polyhydric polyalkylene ether with a cross-linking agent whereby crosslinking is accomplished by the formation of quaternary nitrogen groups, wherein one of the reactants contains a plurality of tertiary nitrogen atoms while the other contains a plurality of halogen or organosulphonate groups which will enter into an alkylation reaction with the tertiary nitrogen to form quaternary nitrogen groups. Thus, the invention contemplates an alkylation reaction between an isocyanate modified polyalkylene ether containing either halogen, organosulphonate or tertiary nitrogen atoms and a cross-linking agent which contains groups reactive with the groups present in the polyurethane polymer to create quaternary nitrogen groups.

The polyalkylene ethers used herein are not the equivalent of polyesters for this cross-linking reaction. Isocyanate modified materials containing ether oxygen atoms which are transformed by the formation of quaternary nitrogen atoms, surprisingly form high grade elastomers of industrial importance.

In accordance with the invention the polyurethane reaction product is prepared by reacting a polyhydric polyalkylene ether with an organic polyisocyanate and a chain extending agent containing active hydrogen atoms which are reactive with NCO groups, if desirable while at least one of the reactants used in the preparation of the polyurethane polymer contains either at least one tertiary nitrogen atom, organosulphonate group or halogen atom. The liquid or solid reaction products are then converted with difunctional or polyfunctional quaternizing agents into elastic synthetic plastics. If the polyurethane polymer contains tertiary nitrogen atoms the quaternizing agents will contain either organosulphonate or halogen and if the polyurethane polymer contains organosulphonate or halogen the quaternizing agent will contain tertiary nitrogen groupings.

Any suitable polyhydric polyalkylene ether may be used, such as the polymerization products of tetrahydrofuran, propylene oxide, ethylene oxide, butylene oxide and the like, as well as copolymerization or graft polymerization products of these compounds. It is also possible to start from homogeneous or mixed polyethers, which are obtained for example, by condensation of hexanediol, methyl hexanediol, heptanediol or octanediol, if desired with addition to 10 to 30% of lower glycols. Ethoxylated or propoxylated (or mixed alkoxylated) glycols such as, ethylene glycol, propylene glycol, butanediol, xylylene glycol, hexanediol and the like may be also used. If the polyether is to contain the quaternizable group, then alkoxylated and in particular ethoxylated and propoxylated glycols with tertiary amino groups, such as propoxylated diethanolamine or alkoxylated primary amines, for example, alkoxylated aniline, toluidine and hydrozine may, for example, be used. Any of the alkylene oxides mentioned above may be used. In this case, each polyether molecule contains a quaternizable nitrogen atom. Another class of suitable polyethers are the addition products of ethylene oxide and propylene oxide to N-methyl-N,N-bis-(γ-methylaminopropyl)-amine. Polyethers containing halogen atoms are obtained by adding, for instance, ethylene oxide or propylene oxide to glycerine-α-chlorohydrin, glycerine-α-bromohydrin, 2,4-bis-methyl-amino-6-chloro-1,3,5-triazin or dibromo pentaerythritol. Polyethers containing R—SO₂O— groups are obtainable by adding, for instance, ethylene oxide or propylene oxide to glycerine-mono-tosylate, pentaerythritol-di-naphthalene sulphonate and trimethylol propane-mono-benzene sulphonate.

As used herein the term "polyhydric polyalkylene ether" also includes polythioethers and polyacetals. Any suitable polyhydric polythioethers may be used such as the condensation products of a polyhydric thioether with itself or with other glycols including those mentioned above or with any of the alkylene oxides mentioned above. Any suitable polyhydric thioether may be used, such as, for example, thiodiglycol, 3,3'-dihydroxy propyl sulfide, 4,4'-dihydroxy butyl sulfide, 1,4-(β-hydroxy ethyl) phenylene dithioether and the like. The thioether may also contain tertiary amino groups by including in the preparation thereof, glycols containing tertiary amines such as dioxyethylaniline in addition to those mentioned above. To provide for polythioethers containing halogen atoms or organosulphonate groups one of the above polyhydric thioethers, such as thiodiglycol, are condensed with one of the above-mentioned glycols containing chlorine or bromine atoms or R—SO₂—O— groups.

Any suitable polyacetals may be used such as the reaction products of aldehydes and polyhydric alcohols and including in particular the water-insoluble types of hexanediol and formaldehyde or hexanediol and divinyl ether, and also of 4,4'-dioxyethoxy-diphenyl-dimethylmethane and formaldehyde. Other suitable alcohols include ethylene glycol, propylene glycol, butanediol, pentanediol, dioxyethylaniline, propoxylated diethanolamine and the like. Additional aldehydes include butyraldehyde, benzaldehyde and the like. Polyacetals containing tertiary nitrogen atoms, halogen atoms or organosulphonate groups can be obtained by replacing at least a part of the glycols to be reacted with formaldehyde by one of the above-mentioned glycols containing tertiary nitrogen atoms, halogen atoms or organosulphonate groups.

These polyhydroxyl compounds can be mixed with one another as well as with those with and without quaternizable groups. The polyhydric polyalkylene ethers should be predominately linear and have a molecular weight of from about 400 to about 10,000 and preferably from about 1000 to about 3000.

Any suitable diisocyanate may be used in reaction with the polyhydric polyalkylene ether to produce polyurethane polymers such as, for example, tetramethylene diisocyanate, hexamethylene diisocyanate, dicyclohexylmethane diisocyanate, cyclohexane diisocyanate, 1,5-naphthalene diisocyanate, 4,4'-diphenylmethane diisocyanate, 4,4'-dibenzyl diisocyanate, 1,3-phenylene diisocyanate, 1,4-phenylene diisocyanate, 2,4-toluylene diisocyanate, 2,6-toluylene diisocyanate and isomeric mixtures thereof, tetramethyl diphenylmethane diisocyanate and the like. It is preferred that aromatic diisocyanates be used. The quaternizable group, i.e., a tertiary amino group may be contained in the polyisocyanate. Any suitable compounds of this type such as, for example, the reaction products of 2 mols of any of the aforementioned diisocyanates with methyl diethanol amine, butyl diethanol amine, N,N-dioxyethyl aniline, N,N'-dioxyethyl toluidine and the like may be used. The polyisocyanate can also contain halogen atoms or the organosulphonate group. Any suitable compounds of this type such as, for example, the reaction products of 2 mols of any of the aforementioned diisocyanate with glycerine-α-chloro-hydrin, glycerine-α-bromohydrin, 2,4-bis-methylamino - 6 - chloro-1,3,5-triazin, dibromo pentaerythritol, glycerine-monotosylate, pentaerythritol-di-naphthalene sulphonate, trimethylol propane-mono-benzene sulphonate and the like may be used. Of course, these polyisocyanates can be mixed with simple diisocyanates such as those mentioned above. Further polyisocyanates with chlorine atoms are 1-chloromethyl-2,4-diisocyanato-benzene, 1-chloromethyl-2,6-diisocyanato-benzene, bis(3-chloromethyl - 4 - isocyanato-phenyl)-methane, 2,2-bis-p-isocyanatophenyl-1-chloropropane, 2,2-bis-p-isocyanatophenyl-1,3-dichloropropane and the compounds of the following formulae

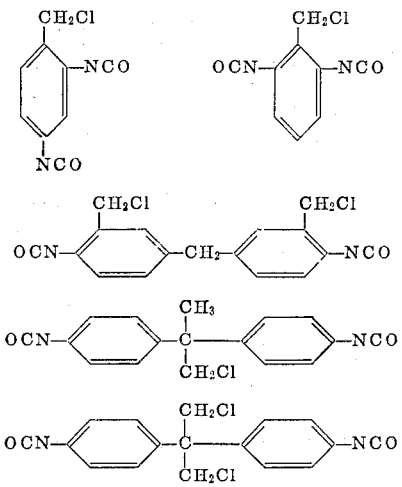

Any suitable chain extending agent containing active hydrogen atoms, which are reactive with NCO groups and having a molecular weight less than about 500, can be used in the preparation of the polyurethane polymers such as, for example, polyhydric alcohols, diamines, amino alcohols and the like. Any suitable polyhydric alcohols may be used such as, for example, ethylene glycol, propylene glycol, butylene glycol, xylylene glycol, phenylene di(β-hydroxy ethylether), trimethylol propane, glycerine, pentaerythritol and the like. Any suitable diamine may be used such as, for example, ethylene diamine, butylene diamine, phenylene diamine, toluylene diamine, 4,4' - diamino diphenylmethane, 3,3' - dichloro 4,4'-diamino diphenylmethane, hydrazine and the like. Any suitable amino alcohol may be used such as, for example, amino ethyl alcohol, amino propyl alcohol, amino butyl alcohol and the like. The quaternizable grouping can be present in the chain extender. Any suitable chain extending agent containing a quaternizable nitrogen atom such as a tertiary amino group may be used, such as, for example, the addition product of 2 mols of ethylene oxide or propylene oxide and monoalkyl amines such as, for example, methyl diethanol amine, butyl diethanol amine, oleyl diethanol amine, N,N-dioxyethylaniline, N,N - dioxyethyltoluidine, alkyl diisopropanol amine and aryl-diisopropanol amine and the like. The alkyl and aryl groups of these compounds can be methyl, ethyl, propyl, butyl, phenyl, naphthyl, tolyl and the like.

In addition to the above mentioned chain extending agents, diprimary tertiary or disecondary tertiary amines such as, for example, N-alkyl diethylene triamine or N-aryl diethylene triamine may be used. The alkyl and aryl portion of the two above mentioned types of compounds may be methyl, propyl, butyl, isopropyl, phenyl, naphthyl, tolyl and the like. The nitrogen atoms are a member of the main chain when such compounds are used. It is more frequently desirable if the quaternizable, that is the tertiary amine, nitrogen is situated in a side chain of the reaction. This can be accomplished when the adducts of aldehydes and methylene active tertiary amines such as, for example, 2-(4-pyridyl)-propanediol or 2-2(quinolyl)-propanediol are used as components. Compounds which yield quaternizable nitrogen atoms in both the main chain and in the side chain of the subsequent reaction product are for example, dioxyethylated hydrazine derivatives and reaction products of dialkyl hydrazines with aldehydes or nitroso compounds and their hydrogenation products, it merely being necessary to ensure that there are still two reactive groups suitable for reaction with isocyanates in addition to the quaternizable nitrogen atom. Any suitable chain extender having halogen atoms may be used such as, for example, glycerine-α-chlorohydrin, -bromohydrin, and ethoxylated 2,4-bis-methylamino-6-chloro-1,3,5-triazine and the like.

Furthermore, chain lengthening agents are to be mentioned which contain at least one R—SO$_2$O— group, wherein R represents an alkyl or aryl radical. For example, the group can be a tosylate or naphthylsulphonate group. Specific examples include the following: glycerine-mono-tosylate, pentaerythritol-di-naphthalene sulphonate and trimethylol propane-mono-benzene sulphonate and the like.

In the preparation of the polyurethane polymer the polyhydric polyalkylene ether is reacted with the organic polyisocyanate by techniques known in the polyurethane art. If desirable any of the chain extending agents mentioned above may be used in addition to the polyhydric polyalkylene ether and the organic polyisocyanate. The reaction can be carried out stepwise or simultaneously. The reaction sequence chosen in any individual case may be determined by the reactivity of the components. It is preferred that the component having the least reactivity be the first reacted with an excess of a polyisocyanate since this more uniformly distributes the tertiary amine groups in the molecule chain. The tertiary amine containing compounds are generally added last and in a single batch. However, as generally stated above, when using very weak tertiary nitrogen amines such as aniline, pyridine derivatives, the amine can be mixed at the start of the reaction of the isocyanate with the polyhydric polyalkylene ether. The polyisocyanate can be present in excess or less than that equivalent or even in equivalent quantities to the active hydrogen atoms present in the system.

If the chain extender is a compound such as glycerine-α-chlorohydrin, it is preferred that it be reacted first with the diisocyanate for the reason that the active hydrogen groups thereof react slowly with the isocyanate groups. Then, in the second step, the reaction product thus formed is reacted with the polyhydric polyalkylene ether. It is however also possible to reverse to order of bringing the reactants together. The same is true in the event that an organosulphonate group is present in one of the starting materials.

By the techniques stated above, the polyurethane polymer will contain either tertiary amino groups, organosulphonate groups or halogen atoms. When the polyurethane polymer contains tertiary amino groups, it is cross-linked with a di- or polyfunctional alkylating agent containing halogen atoms or R—SO$_2$O groups where R has the meaning set forth above. If the polyurethane polymer contains halogen atoms or R—SO$_2$O groups, it is cross-linked with a compound containing at least two tertiary amine groups. Thus, in either embodiment of this invention the crosslinking is accomplished by the formation of quaternary nitrogen groups. If a casting process is to be conducted the crosslinking agent can be incorporated by stirring into the melt of the polyurethane reaction product while it is still in a liquid pourable condition. The melt is then immediately cast into molds where solidification together with shaping takes place at a high temperature of from about 60 to about 150 within 5 to about 120 minutes followed by a subsequent final heating. If NCO groups are present in excess in the pourable melt crosslinking occurs simultaneously by the polyaddition reaction and by the quaternizing crosslinking reaction. If the polyurethane polymer is further heated prior to addition of the cross-linking agent the reaction product is solidified and finally constitutes a rollable material such as a millable gum into which the cross-linking agent and other ingredients such as active fillers, plasticizers, pigments and the like can be incorporated by rolling on a conventional roller such as that used in the rubber industry. The crosslinking then takes place in vulcanizing presses with shaping. Any suitable di- or polyfunctional alkylating agent can be used to crosslinking polyurethane polymers containing tertiary amino groups such as, for example, p-xylylene-dichloride, 1,3-dimethyl-4,6-di-(chloromethyl)-benzene, tetrabromopentaerythritol and dibromobutane, as well as the corresponding tosylates, benzene sulphonates, naphthalene sulphonic acid esters and the like. Halogen-acylated diamines, such as N,N'-bis-chloracetal-hexamethylene-diamine, as well as the corresponding derivatives of other aliphatic or aromatic diamines are also suitable. Those compounds having a vapor pressure which permits processing on a rubber mixing roller are preferred.

From the physiological point of view, long-chain dihalides such as are necessary for producing a uniform "mesh size" of the lattice which is formed, are particularly desirable. In the simplest case, they are obtained by reacting a diisocyanate, such as diphenylmethane diisocyanate or toluylene diisocyanate, with 2 mols of ethylene chlorhydrin, or by reaction of a triisocyanate with 3 mols of ethylene chlorhydrin. It is even more desirable in certain circumstances to use a diisocyanate or polyisocyanate extended by means of less than an equivalent quantity of polyethers, polythioethers or polyacetals and to react the same with a halogenated alcohol. When using the casting process, relatively volatile cross-linking agents, such as dichlorobutane or trichloroisobutane may be used in addition to those mentioned.

It is advantageous to use such quantities of the difunctional or polyfunctional alkylation agents that all the tertiary nitrogen of the reaction product is quaternized, so that the elastomer which is formed no longer contains any basic fractions. Depending on the degree of crosslinking required, it is also possible to use more or less than the equivalent quantity of cross-linking agent, it being necessary to ensure that when the cross-linking agent is in excess, some of said agent only reacts monofunctionally and accordingly the cross-linking density is reduced again. By the nitrogen content in the reaction product and the quantity of cross-linking agent as well as the length of the cross-linking molecule being matched to one another, it is possible for the properties of the resulting elastomers to be varied within wide limits and in the manner required.

Any compounds having two tertiary amino groups can be used as cross-linking agents when the polyurethane polymers contain halogen or R—SO$_2$O groups such as, for example, ditertiary amines of different chain lengths, such as methylene-bis-dimethylaniline, N-ethyl-N-β-dimethyl-amino-ethylaniline, tetramethyl ethylene diamine, tetramethyl-hexamethylene diamine, di-Mannich bases, for example of acetone, methylethyl-ketone, cyclohexanone, urea and the like. Particularly suitable compounds are the reaction products of diisocyanates or triisocyanates or extended diisocyanates with tertiary amino alcohols, such as N,N-dimethylaminoethanol.

Specific compounds with two tertiary amino groups are tetramethyl-ethylenediamine,
tetramethyl-propylenediamine,
tetramethyl-tetramethylenediamine,
tetramethyl-hexamethylene-diamine,
pentamethyl-dipropylenetriamine,
hexamethyl-triethylenetetramine,
tetraethyl-tetramethylenediamine,
1,4-bis-dimethylaminomethylbenzene,
4,4'-bis-dimethylamino-perhydrodibenzyl,
4,4'-bis-dimethylamino-dicyclohexylmethane,
α,α'-dimethylaminoethyl-benzylcyanide,
1,3-bis-dimethylaminobutane, hexamethylene-bis-carbamic acid-bis-dimethylamino-ethyl ester,
bis-dimethylaminopropyl-ethylene glycol-diether,
bis-dimethylaminopropyl-diethylene glycol-ether,
bis-dimethylamino-methyl-cyclohexanone,
bis-dimethylaminoethyl-cyclopentanone,
4-(β-N-pyrrolidylethyl)-pyridine,
2-(β-dimethylaminoethyl)-pyridine,
bis-(α-pyridylethyl)-benzylamine,
N,N,N',N'-tetrabis-(dimethylaminopropyl)-p-phenylenediamine,
N,N'-bis-(α-pyridylethyl)-m-phenylenediamine,
N,N'-bis-(γ-pyridylethyl)-p-phenylenediamine,
N,N'-bis-(dimethylaminopropyl)-m-phenylenediamine,
bis-morpholino-methylurea,
bis-piperidinomethyl-biuret,
1,6-bis-dimethylaminohexanol-(2),
1,3-diethylamino-propanol-(2),
2,2-bis-dimethylamino-methylpropandiol-1,3,
fumaric acid-bis-β-dimethylaminoethyl ester,
dimethyl-allyl-(3-dimethylamino-2-dimethylamino-methyl-2-hydroxy)-propylammoniumchloride,
N,N-dimethylaminopropylaniline,
N,N-dimethylaminopropyl-m-toluidine,
N,N-dimethylaminopropyl-benzene-sulphoneamide,
N,N-dimethylaminoethyl-p-toluene-sulphoneamide,
bis-(methyl-allyl-amhinoethanol)-hexamethylene-bis-urethane;

addition products of, for example, dimethylaminoethanol, diethylaminopropanol, N,N-dimethyl-ethylenediamine, N-dimethylamino-propyl-ethanolamine, or bis-dimethylaminopropylamine and diisocyanates and polyisocyanates.

Specific compounds with a plurality of halogen atoms are 1,3-dibromobutane, 1,4-dichlorobutane, 1,4-dibromobutane, 1,2,3-trichloroisobutane (only two chloro atoms are reactive), 1,6-dibromohexane,
1,3-dibromo-neopentane,
1,3-bis-chloromethyl-4,6-dimethyl-benzene,
o-, m-, p-xylylenedichloride,
bis-chloromethyl-naphthalene,
bis-chloromethyl-diphenylether,
bis-chloromethyl-durol,
bis-chloromethyl-tetrachlorobenzene,
1,4-dichlorobutene,
1,4-dichlorobutine,
dichloromethylether,
dichloroethylether,
dibromobutylether,
dichloro-diethylsulphide,
dibromo-diethylsulphide,
dichloro-diethylsulphone,
9,10-dichloroanthracene,
cyanurchloride,
tris-chlorohexylisocyanurate,
adipic acid-bis-β-bromoethyl ester,
succinic acid-bis-β-chloroethyl ester;

halogenacylated polyamines such as bis-chloroacetylhydrazine,
bis-chloroacetyl-N,N'-dimethylhydrazine,
methylene-bis-bromoacetamide,
bis-chloroacetyl-ethylenediamine,
bis-chloroacetyl-N,N'-dimethylethylenediamine,
bis-chloroacetyl-piperazine,
bis-bromoacetyl-tetramethylenediamine,
bis-chloroacetyl-hexamethylenediamine,
bis-bromoacetyl-hexamethylenediamine,
bis-α-chloropropionyl-piperazine;

bis-urethanes of diisocyanates and bromoethanol or chloroethanol such as 4,4'-methylene-bis-carbanilic acid-bis-bromoethyl ester,
hexamethylene-bis-bromoethylurethane,
toluylene-2,4-bis-bromoethylurethane,
toluylene-2,6-bis-bromoethylurethane,
hexamethylene-bis-chloromethylphenyl-carbamic acid ester,
tetramethylene-bis-chloromethyl-phenylurea etc.,
1,3-dichloropropanol-2,
1,3-dibromopropanol-2,
2,2-bis-chloromethyl-propanediol,
1,3-dichloroacetone,
1,5-dichloro-acetylacetone
1,4-dibromo-adipodinitrile,
bis-(α-chlorobenzylidene)-hydrazine,
N,N-bis-chloroethylaniline,
N,N-bis-bromoethyl-toluidine,
bis-bromoethyl-alkenyl-phosphineoxide, such as hydroxyethylated vinylphosphonic acid-bromide,
bis-bromoacetyl-1,2-phenylenediamine-carboxylic acid,
2,5-bis-(chloroacetamido)-anisol-4-sodium sulphonate,
trichloropentaerythritol,
dibromopentaerythritol,
fumaric acid-bis-β-bromoethyl ester,
bis-chloromethyl-diphenylmethane-diisocyanate,
1,3-dibromopropanol-(2)-allylether,
N,N-bis-β-bromoethylbenzenesulfonic acid amide.

Specific compounds with a plurality of sulphonate groups are 1,3-propanediol-bis-benzene-sulphonate,
1,4-butane-diol-bis-tosylate,
diethyleneglycol-bis-tosylate,
pentaerythritol-bis-benzene-sulphonate,
glycerine-bis-naphthalene-sulphonate,
p-xylyleneglycol-bis-methane-sulphonate,
octaethyleneglycol-bis-methane sulphonate,
mannitol-hexa-benzene-sulphonate,
trimethylolpropane-tris-tosylate,
hexanetriol-bis-butane-sulphonate,
dioxethyl-aniline-bis-methane-sulphonate,
dioxethyl-hydroquinone-bis-methane-sulphonate,
terephthalic acid-bis-glycol ester-bis-tosylate.

Amine cross-linking agents are used in such quantities that the elastomer prepared contains 0.2 to 3% of nitrogen derived from the ditertiary amine.

In order to obtain a lattice which is as uniform as possible and which results in favorable mechanical properties in the finished elastomer, the following embodiment of the process according to the invention is preferably employed: starting from a polyether isocyanate, which is for example, obtained by reacting 2 mols of polyether with 3 mols of diisocyanate, firstly a reaction product is prepared by reaction with an equivalent quantity of a halogen diol (or tertiary aminediol) and secondly the cross-linking agent therefore is prepared by reaction of the same polyether isocyanate with twice the molar quantity of tertiary amine in the form of the amino alcohol or diamine (or of halogen compound in the form of the halogen alcohol).

In the production of the new elastomers by the method usual in the rubber industry, it is expedient to operate in such a way that by suitable proportioning of the quantity of isocyanate, a reaction product is obtained which has a Defo hardness of 200 to 5000, into which the difunctional or polyfunctional peralkylation agent or the ditertiary amine is incorporated by rolling on a rubber roll stand. The crosslinking occurs at high temperature, advantageously 80 to 150° C. in vulcanizing presses and with shaping and is generally completed after 15 to 60 minutes. When using very active cross-linking agents and highly basic amines, it may be effected at lower temperatures so that a scorching on the roller is still completely avoided. Vulcanizates of rubber-like elasticity are obtained, the mechanical values of which can be still further improved by previous incorporation of highly active fillers by rolling.

When processing from the melt, that is in the casting procedure, it is possible for the casting time to be varied within wide limits by the quaternizing components being matched to one another. It is also possible to have the cross-linking agent already in the reaction mixture when the chain-lengthening agent is added for chain-lengthening. In such cases both of them react simultaneously. It is possible for molded element, elastic antistatic foils and filaments to be produced.

Both forms of the process also permit the incorporation of blowing agents so that molded components with a foam rubber structure are formed.

One particular advantage of the elastomers crosslinked by quaternization according to the invention compared with elastomers crosslinked in other ways, is that the polar groups are only disposed at the branching points, but the chain segments are non-polar so that a certain hydrophylic character is combined with only a slight swellability in water.

The plastics prepared in accordance with this invention can be fabricated into various articles such as, ball joints for automobiles, fibers, shoe soles and heels, gears and the like.

Example 1

About 1000 parts of polytetrahydrofuran having a molecular weight of about 3000 are dehydrated for about 30 minutes at about 130°/12 mm. Hg, about 167 parts of 4,4'-diphenylmethane diisocyanate are added to the melt at about 70° and the mixture is stirred for about 15 minutes, while the temperature rises to about 80°. After adding about 40 parts of methyldiethanolamine, the temperature quickly rises to about 100° and the melt becomes viscous. It is poured into boxes and finally heated for another 24 hours at about 100°. About 30% of active carbon black and about 2.8% of 1,3-dimethyl-4,6-bis-chloromethyl benzene are incorporated by rolling into the reaction product which is obtained. After crosslinking in the press for about 60 minutes at about 130° C. a vulcanizate is obtained with the following properties:

Strength _____ kp./cm.$^2$__ 278
Breaking elongation _____ percent__ 545
Tension value at 300% elongation ____ kp./cm.$^2$__ 168
Shore Hardness A (20°) _____ 74
Rebound elasticity (20°/75°) _____ percent__ 61/63
Permanent elongation after one minute and
  one hour, respectively _____ percent__ 16/11
Structure (4 mm.) _____ kg. abs__ 17

Using about 15% highly active siliceous earth instead of carbon black, the following values are obtained:

Strength _____ kp./cm.$^2$__ 243
Breaking elongation _____ percent__ 535
Tension value at 300% elongation ____ kp./cm.$^2$__ 93
Shore Hardness A (20°) _____ 67
Rebound elasticity (20°/75°) _____ percent__ 57/63
Permanent elongation after one minute and
  one hour, respectively _____ percent__ 17/10
Structure.
Water absorption, 24 hours,
  room temperature _____ vol. percent__ 2.5

Example 2

The procedure is as indicated in Example 1, but using about 127 parts of 4,4'-diphenylmethane diisocyanate and about 20 parts of methyldiethanolamine. After incorporation of about 15% highly active siliceous earth and about 1.4% of 1,3-dimethyl-4,6-chloromethylbenzene by rolling and crosslinking in the press at about 130°, a vulcanizate having the following properties is obtained:

Strength _____ kp./cm.$^2$__ 191
Breaking elongation _____ percent__ 850
Tension value at 300% elongation ____ kp./cm.$^2$__ 22
Tension value at 500% elongation ____ kp./cm.$^2$__ 71
Shore Hardness A (20°) _____ 55
Rebound elasticity (20°/75°) _____ percent__ 53/55
Permanent elongation after one minute and
  one hour, respectively _____ percent__ 51/20
Structure (4 mm.) _____ kg. abs__ 7

Example 3

About 1000 parts of polypropylene glycol ether having an hydroxyl number of 62.6 are dehydrated for about 30 minutes at about 130°/12 mm. Hg. About 230 parts of 4,4'-diphenylmethane diisocyanate are added to the clear liquid, which is stirred for about 45 minutes from about 120 to about 130° C. After adding about 40 parts of methyldiethanolamine, the temperature rises to about 140° C. with an increase in viscosity. The composition is poured into boxes and finally heated for about 24 hours at about 100° C. About 15% of highly active siliceous earth, about 1% of stearic acid and about 2.3% of 1,4-bis-chloromethyl benzene are incorporated by rolling into the fairly soft reaction product which is obtained. After crosslinking in the press for about 30 minutes at about 130° C., a vulcanizate is obtained which has the following properties:

Strength _____ kp./cm.$^2$__ 107
Breaking elongation _____ percent__ 340
Tension value at 300% elongation ____ kp./cm.$^2$__ 93
Shore hardness A (20°) _____ 57
Rebound elasticity (20°/75°) _____ percent__ 47/55
Permanent elongation after one minute and one
  hour, respectively _____ percent__ 7/5
Structure (4 mm.) _____ kg. abs__ 7

By using about 2.7% of 1,3-dimethyl-4,6-bis-chloromethyl benzene as crosslinking agent and a vulcanization time of about 60 minutes at about 130°, the following values are obtained:

Strength _____ kp./cm.$^2$__ 117
Breaking elongation _____ percent__ 655
Tension value at 300% elongation ____ kp./cm.$^2$__ 47
Shore hardness A (20°) _____ 52
Rebound elasticity (20°/75°) _____ percent__ 48/53
Permanent elongation after one minute and one
  hour, respectively _____ percent__ 25/13
Structure (4 mm.) _____ kg. abs__ 10

Example 4

About 200 parts of polypropylene glycol having an hydroxyl number of 63 are dehydrated at about 130° C. and then about 54 parts of 4,4'-diphenylmethane diisocyanate are added to this. The mixture is allowed to react for about 15 minutes, then it is cooled to about 70° C. and about 3 parts of butanediol and about 8 parts of methyldiethanolamine are added successively. About 7.3 parts of dibromobutane are incorporated after one minute by stirring and the melt is poured into molds. Final heating takes place for about 24 hours at about 100° C. and a molded element is obtained which has the following mechanical properties:

Strength _____ kp./cm.$^2$__ 102
Breaking elongation _____ percent__ 390
Tension value at 300% elongation ____ kp./cm.$^2$__ 54
Shore hardness A (20°) _____ 70
Rebound elasticity (20°/75°) _____ percent__ 53/67
Permanent elongation after one minute and one
  hour, respectively _____ 2/0

Example 5

About 4 drops of concentrated hydrochloric acid are added to about 200 parts of polyethylene glycol (hydroxyl number 134), which is dehydrated at about 130° C. for about 15 minutes; after cooling to about 60° C. about 77 parts of 4,4'-diphenylmethane diisocyanate are added. The mixture is cooled to about 40° C., about 4.1 parts of dibromobutane and about 8 parts of N-methyldiethanolamine are incorporated successively by stirring.

Immediately thereafter the viscous melt is poured into a hot mold and heated to about 100° C. for about 24 hours.

| | |
|---|---|
| Strength _____kp./cm.² | 20 |
| Breaking elongation _____percent | 100 |
| Shore hardness A (20°) _____ | 46 |
| Rebound elasticity (20°) _____percent | 56 |
| Permanent elongation after one minute and one hour, respectively _____percent | 1/1 |
| Structure _____kg. abs | 9.5 |

For control purposes a mixture is prepared from the aforesaid components, but without the addition of dibromobutane. There is obtained a plastic mass which readily dissolves in acetone.

When using about 53.5 parts of toluylene diisocyanate (mixture of isomers 65:35) instead of diphenylmethane diisocyanate, the following values are obtained:

| | |
|---|---|
| Strength _____kp./cm.² | 20 |
| Breaking elongation _____percent | 110 |
| Shore hardness A (20°) _____ | 40 |
| Rebound elasticity _____percent | 54 |
| Permanent elongation after one minute and one hour, respectively _____percent | 1/1 |
| Structure _____kg. abs | 7 |

Example 6

The procedure is as indicated in Example 5, but there are used about 200 parts of polyacetal from technical triethylene glycol and formaldehyde (hydroxyl number 78) with the addition of about 51.5 parts of 4,4'-diphenylmethane diisocyanate, about 8 parts of N-methyldiethanolamine and about 4.1 parts of dibromobutane. A soft elastomeric plate is obtained.

Shore hardness A _____ 28

Example 7

The procedure is as indicated in Example 5, but there are used about 200 parts of polythioether from thiodiglycol and ethylene glycol (hydroxyl number 40.5) with the addition of about 35 parts of 4,4'-diphenylmethane diisocyanate, about 8 parts of N-methyldiethanolamine and about 4.1 parts of dibromobutane. An elastomeric plate is obtained.

| | |
|---|---|
| Shore hardness A (20°) _____ | 53 |
| Rebound elasticity _____percent | 40 |

This mixture, but without the addition of dibromobutane, yields a soft sticky resin.

Example 8

About 250 parts of polypropylene glycol (viscosity 379 cp./25° C.), hydroxyethylated from the hydroxyl number 56 to the hydroxyl number 46.5, are dehydrated after the addition of concentrated hydrochloric acid at about 130° C. for about 15 minutes, about 50 parts of 4,4'-diphenylmethane diisocyanate are added at about 50° C. and about 5.1 parts of dibromobutane are added at about 40° C. To remove air bubbles the melt is briefly evacuated, and about 10 parts of N-methyldiethanolamine are then added. After pouring into molds and final heating at about 100° C. for about 24 hours an elastomeric plate is obtained.

Example 9

About 47 parts of 4,4'-diphenylmethane diisocyanate and about 25 parts of triethylene glycol-bis-m-chloromethylphenylurethane (prepared from 1 mol of triethylene glycol and 2 mols of m-chloromethylphenyl isocyanate) are added at about 60° C. to about 300 parts of a polyproxylated N-methyldiethanolamine (hydroxyl number 59.4; viscosity 289 cp./25° C.). Air bubbles are removed by evacuation of the melt which is then poured into a hot mold. After final heating at about 80° C. for about 12 hours an elastomeric plate is obtained.

Example 10

About 150 parts of polypropylene gylcol (hydroxyl number 56) are reacted at about 130° C. for about 10 minutes with about 45 parts of 4,4'-diphenylmethane diisocyanate, and the reaction product of about 8.4 parts of diethanolamine and about 13.4 parts of m-chloromethylphenyl isocyanate in about 50 parts of polypropylene glycol and about 10 parts of acetone is added thereto at about 40° C. After about 10 minutes about 7 parts of permethylated diethylenetriamine are added with stirring at about 40° C. Immediately after the addition is complete the melt is poured into a mold wherein the mass solidifies at once to a hard elastic material.

Without the addition of triamine a soft mass of high plasticity is obtained.

Example 11

About 200 parts of polytetrahydrofurane (hydroxyl number 43) are dehydrated at about 130° C. for about 15 minutes, and about 7.9 parts of 3-chloropropandiol and about 35.4 parts of 4,4'-diphenylmethane diisocyanate are added at about 75° C.

After cooling to about 60° C. about 7 parts of permethylated diethylenetriamine are added with stirring whereupon the melt is finally heated at about 130 to 150° C. for about 6 hours.

| | |
|---|---|
| Strength _____kp./cm.² | 100 |
| Breaking elongation _____percent | 885 |
| Shore hardness A (20°) _____ | 44 |
| Rebound elasticity _____percent | 46 |
| Structure _____kg. abs | 8 |

Example 12

After dehydration at about 130° C. about 195 parts of 2,4-toluylene diisocyanate are added to about 1000 parts of polypropylene glycol; the temperature is kept at about 130 to 140° C. for 1 hour, about 101 parts of 1,4-butanediol are added and final heating takes place at about 130 to 140° C. for about 1 hour. About 225 parts of 4,4-diphenylmethane diisocyanate are added to the addition product at about 80° C., the mixture is allowed to react at about 80 to 100° C. for about 15 minutes, and about 40 parts of N-methyldiethanolamine are added with stirring. The viscous melt is poured into boxes and finally heated at about 100° C. for about 24 hours. 15 percent highly active siliceous earth and 2.2 percent 1,3-dimethyl-4,6-bis-chloromethylbenzene are incorporated by rolling into the resulting elastomeric reaction product. After crosslinking in the press at about 130° C. for about 30 minutes a vulcanizate with the following properties is obtained:

| | |
|---|---|
| Strength _____kp./cm.² | 146 |
| Breaking elongation _____percent | 410 |
| Tension value at 300% elongation ____kp./cm.² | 100 |
| Shore hardness A (20°/75°) _____ | 61/49 |
| Rebound elasticity (20°/75°) _____percent | 25/44 |
| Permanent elongation after one minute and one hour, respectively _____percent | 15/7 |
| Structure (4 mm.) _____kg. abs | 16 |

Example 13

About 200 parts of polytetrahydrofurane (hydroxyl number 43) are dehydrated at about 130° for about 15 minutes, and about 17.5 parts of glycerine-α-monotosylate and about 35.4 parts of 4,4'-diphenylmethane diisocyanate are added at about 75° C. After cooling to about 60° C. about 7 parts of permethylated diethylenetriamine is incorporated by stirring and the reaction mixture is poured to give plates. The plates are finally heated at about 130 to 150° C. for about 6 hours.

It is of course to be understood that any of the reactants set forth throughout the specification can be used in the examples in place of those specifically used therein. Thus, any polyhydric polyalkylene ether, organic polyisocyanate or chain extender can be used. Further, in accordance with the above any of the reactants may contain the tertiary amino groups and either the halogen atoms or sulphonate groups in such a relation that cross-linking through quaternization takes place.

Although the invention has been described in considerable detail for the purpose of illustration, it is to be understood that variations can be made by those skilled in the art without departing from the spirit of the invention and scope of the claims.

What is claimed is:

1. A process for the preparation of cross-linked polyurethane plastics which comprises preparing in the first step (1) a polyurethane intermediate by reacting (a) a polyhydric polyalkylene ether, (b) an organic polyisocyanate and (c) a chain extending agent having active hydrogen atoms which are reactive with NCO groups and having a molecular weight less than about 500, said polyurethane intermediate containing groups selected from the class consisting of tertiary amino groups, chlorine atoms, bromine atoms, and organo sulfonate groups and reacting said polyurethane intermediate with (2) a member selected from the group consisting of (a) a quaternizing cross-linking agent containing at least 2 groups selected from chlorine atoms, bromine atoms, and organo sulfonate groups and (b) a quaternizable cross-linking agent containing at least 2 tertiary amino groups, when said polyurethane intermediate contains chlorine atoms, bromine atoms, or organo sulfonate groups, said cross-linking agent is a quaternizable cross-linking agent, and when said polyurethane intermediate contains tertiary amino groups, said cross-linking agent is a quaternizing cross-linking agent.

2. The process of claim 1 wherein the polyurethane intermediate contains tertiary amino groups and the quaternizing agent contains at least two chlorine atoms.

3. The process of claim 1 wherein the polyurethane intermediate contains at least two organo sulfonate groups.

4. The process of claim 1 wherein the polyurethane intermediate contains at least two bromine atoms.

5. The process of claim 1 wherein the polyurethane intermediate contains a member selected from the group consisting of chlorine atoms, bromine atoms and organo sulfonate groups.

6. The process of claim 1 wherein the polyurethane intermediate contains tertiary amino groups.

7. The process of claim 6 wherein the polyhydric polyalkylene ether contains tertiary amino groups.

8. The process of claim 6 wherein the organic polyisocyanate contains tertiary amino groups.

9. The process of claim 6 wherein the chain extending agent contains tertiary amino groups.

References Cited

UNITED STATES PATENTS

| | | | |
|---|---|---|---|
| 2,929,800 | 3/1960 | Hill | 260—77.5 |
| 3,294,752 | 12/1966 | Wilkinson | 260—77.5 |
| 3,036,998 | 5/1962 | Rudner | 260—77.5 |
| 3,219,639 | 11/1965 | Fuchs et al. | 260—80.5 |
| 3,226,354 | 12/1965 | Heiss | 260—31.2 |
| 3,180,853 | 4/1965 | Peters | 260—77.5 |
| 2,915,545 | 12/1959 | Tazuma | 260—77.5 |
| 3,026,275 | 3/1962 | Muller | 260—77.5 |
| 3,094,434 | 6/1963 | Chapman | 260—77.5 |
| 3,148,173 | 9/1964 | Axelrood | 260—77.5 |

FOREIGN PATENTS

| | | |
|---|---|---|
| 581,096 | 8/1959 | Canada. |
| 791,854 | 3/1958 | Great Britain. |

DONALD E. CZAJA, *Primary Examiner.*

F. McKELVEY, *Assistant Examiner.*